United States Patent Office 3,354,192
Patented Nov. 21, 1967

3,354,192
HALOALKYLALUMINUM COMPOUNDS
Charles E. Frank and Jawad H. Murib, Cincinnati, Ohio, assignors to National Distillers and Chemical Corporation, New York, N.Y., a corporation of Virginia
No Drawing. Filed Sept. 16, 1963, Ser. No. 309,282
17 Claims. (Cl. 260—448)

ABSTRACT OF THE DISCLOSURE

A process for preparing stable alkylaluminum complex-compounds, by reacting a haloalkylborane compound with an aluminum alkyl in the presence of a Lewis base, and for the preparation of a higher molecular weight compound by reacting the lower weight haloalkylaluminum complex with an olefin to obtain a long-chain haloalkylaluminum compound from which the corresponding haloalkyl and halo alcoholate can be produced.

---

This invention relates to haloalkylaluminum compounds, and to methods of producing and stabilizing them, especially those having haloalkyl groups containing more than three carbon atoms.

According to the prior art, an aluminum-carbon bond of an aluminum alkyl or aluminum alkyl halide group is unstable in the presence of a halogen-carbon bond of a haloalkyl group of greater than two carbon atoms when such bonds are present either in separate molecules or in the same molecule. For example, Ziegler (H. Zeiss, Organometallic Chemistry, Reinhold Publishing Corporation, New York, page 198, 1960) states expressly "alkyl halides with more than two carbon atoms in the alkyl group are unstable in contact with alkyl aluminum halides." This fact is further emphasized by Hatch (Petroleum Refiner, 39, 109 (1960)) who teaches that aluminum alkyls react vigorously with chlorinated aliphatic hydrocarbons and other alkyl halides.

Hoberg (Angew. Chem. 73, 114 (1961)) treated a halomethyldialkylaluminum compound, $R_2AlCH_2I$, with ethylene in an attempt to obtain a stable haloalkylaluminum compound wherein the haloalkyl group would contain three carbon atoms, i.e.,

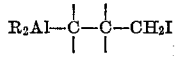

Instead of the desired product, Hoberg obtained cyclopropane and dialkylaluminum iodide and therefrom indicated the linkage

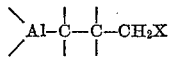

as such, to be highly unstable. Similarly, the analogous four-carbon linkage as occurring in

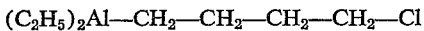

was shown to be unstable above 50° C. by Binger and Koster (Tetrahedron Letters, No. 4, pp. 156–160 (1961)).

One object of this invention is to provide a process which solves the difficulties of the prior art by enabling the preparation of stable haloalkylaluminum compounds wherein the haloalkyl portion may have a chain length of greater than 3 carbon atoms.

Another object is to provide a novel process for the preparation and stabilization of haloalkylaluminum compounds.

A further object is to provide novel stable haloalkylaluminum compositions.

In general terms, this invention involves the preparation of a haloalkylaluminum compound by reacting a haloalkylborane compound with an aluminumalkyl in the presence of a Lewis base. The reaction sequence may be described by the following equations:

(1) $Y'_nB(RX)_{3-n} + Y_nAlR'_{3-n} \rightleftharpoons Y_nAl(RX)_{3-n} + Y'_nBR'_{3-n}$ (2) $Y_nAl(RX)_{3-n} + Z \rightarrow Z:Al(RX)_{3-n}Y_n$ wherein R is a substituted or unsubstituted polymethylene radical having a chain length of 4 or more carbon atoms, that is, wherein the halogen atom is positioned at least 4 carbon atoms distant from the B—C bond, e.g., tetramethylene, pentamethylene, hexamethylene, 5-methylpentamethylene, octamethylene, 1 - octyldecamethylene, octadecamethylene, nonacontamethylene, etc.; R' is hydrogen or a lower alkyl radical having from 1 to 4 carbon atoms such as methyl, ethyl, propyl, isopropyl, butyl, isobutyl, etc.; X is a halogen atom, e.g., fluorine, chlorine, bromine, or iodine; Y and Y' are radicals, such as hydrogen, halogen, and a lower alkyl having from 1 to 4 carbon atoms; Z is a Lewis base, i.e., an electron donor, which does not contain a protonic hydrogen, e.g., ethers of Group VI–A elements of the periodic system (Handbook of Chemistry and Physics, 42nd ed., Cleveland, Chemical Rubber, 1960, pp. 448–449) such as dimethyl ether, diethyl ether, methylethyl ether, dipropyl ether, dibutyl ether, B,B'-dichloroethyl ether, methylphenyl ether, diphenyl ether, dimethyl sulfide, diethyl sulfide, tetrahydrothiophene, dimethyl selenide, etc., and various alkyl and aryl derivatives of the Group V–A elements, e.g., tertiary amines such as trimethyl amine, triethyl amine, triisobutyl amine, dimethyl aniline, and pyridine, as well as tertiary phosphines such as trimethyl phosphine, triethyl phosphine, triphenyl phosphine, and nitriles such as acetonitrile, propionitrile, etc.; and n is an integer having a value of 0, 1, or 2. Where the value of n is 0 or 1, that is, where 2 or 3 RX-groups are transferred from the boron atom to the aluminum atom, such RX-groups may be the same or different halogenated polymethylene radicals.

For the sake of convenience only, the following detailed description of the invention is presented in terms of the reaction of a trihaloalkylborane with an aluminum trialkyl in the presence of an oxygen ether, and the product resulting therefrom. It is to be understood, however, that the invention is also applicable to the aforedescribed broad classes of reactants, inclusive, for example, of alkyl haloalkylboranes, halo haloalkylboranes, dialkyl and monoalkyl aluminum halides or hydrides, etc., through obvious changes and modifications of starting compounds.

In accordance with this embodiment, an aluminum trialkyl is contacted with an ether and the resultant complex then contacted with a trihaloalkylborane. Alternatively, the aluminum trialkyl is contacted with the trihaloalkylborane and the ether then added. An excess of ether may be present to serve as a reaction solvent. If it is desired to minimize the excess of ether, e.g., where the ether is relatively non-volatile and difficult to remove by distillation, an inert diluent may be added. The reaction is carried out under an inert atmosphere. Upon completion of the reaction, the by-product trialkylborane, any diluent and free ether are removed by distillation and the haloalkylaluminum derivative isolated in the form of a stable etherate complex.

Alternatively, the reaction may be carried out by adding diborane to a mixture of an ether, an aluminum trialkyl and a chloroalkene. Excess ether or an inert diluent may serve as the reaction solvent. Upon completion of the reaction, by-product trialkylborane, uncombined ether, and any inert diluent are removed by distillation, leaving as a product the trihaloalkylaluminum in the form of a stable etherate complex.

Preferably the alkyl groups of the aluminum trialkyl should be of such a chain length as to yield a volatile boron trialkyl as a result of the exchange reaction in order to facilitate completion of reaction and separation of the boron by-product. An alkyl group which is methyl or ethyl provides a suitably volatile boron by-product.

The trihaloalkylborane may contain polymethylene radicals having a chain length of 4 or more carbon atoms, preferably of 4 to about 30 carbon atoms. Particularly suitable compounds include tri($\omega$-chlorobutyl)borane, tri($\omega$-chloropentyl)borane, tri($\omega$-chlorohexyl)borane, tri(5-chlorohexyl)borane, tri($\omega$-chlorohexyl)borane, tri($\omega$-bromobutyl)borane, tri(5-iodohexyl)borane, and the like. Such compounds may be conveniently prepared by reacting a chloroalkene with diborane in ether solvents according to the procedures employed by H. C. Brown and B. C. Subba Rao (J. Am. Chem. Soc., 78, 2582 (1956)) to make trialkylboranes from the reaction of olefins with diborane.

It is preferable that the ether be sufficiently volatile to enable ready separation of any excess by distillation from the trihaloalkylaluminum etherate product. Preferred ethers of the oxygen ether class include dimethyl ether, diethyl ether, dipropyl ether, di-n-butyl ether, anisole, diphenyl ether, and B,B'-dichloroethyl ether.

In instances wherein it is desired to minimize the quantity of ether used, a diluent can be included in the reaction mixture to increase the miscibility of the reactants. Such a diluent must be chemically inert towards both the reactants and products. It should also be relatively volatile to permit easy removal from the product. Suitable diluents include saturated aliphatic hydrocarbons and aromatic hydrocarbons, e.g., hexane, nonane, isooctane, benzene toluene, xylene, mesitylene as well as inert chlorinated hydrocarbons such as chlorobenzene, o- and p-chlorobenzene, o-chlorobenzene, p-dichlorobenzene, 2-4 dichlorotoluene, and o-xylyl chloride, halogenated acyclic hydrocarbons, such as carbon tetrachloride, the Freons including

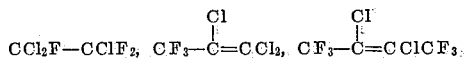

and halogenated cycloaliphatic compounds such as perfluorodimethyl cyclohexane ($C_8F_{16}$).

The trialkylaluminum and trihaloalkylborane compounds are preferably contacted in substantially equimolar amounts. Higher ratios of the boron compound lead to a contaminated product while lower ratios lead to incomplete conversion to the desired product. Excess unreacted trialkylaluminum, in the absence of a corresponding excess of ether, tends to attack the carbon-halogen bonds of the haloalkylaluminum product, consequently, an amount of ether at least equimolar with respect to the trialkylaluminum should be used. Generally, it is most convenient to employ a large enough excess of the ether over that required for formation of the stable haloalkylaluminum-etherate and for complexing of any excess trialkylaluminum so that such excess can function as a reaction solvent.

The exchange reaction is normally carried out at ambient temperatures, although lower temperatures, e.g., 0° C. or below, can be used, however, with some sacrifice of reaction rate. Higher temperatures, e.g., up to about 120° C., or above can be used, but are accompanied by a tendency toward undesirable side reactions. The preferred temperature range is from about 50° to 100° C. Reaction pressure is not critical. For convenience, the reaction is generally carried out at about atmospheric pressure or below depending on the volatility of the reactants of products, although higher pressures, e.g., up to 100 p.s.i. or more may be employed. The products of the aforedescribed novel process are novel haloalkyl-aluminum-Lewis base complexes. These complexes are particularly useful as intermediates in the preparation of long chain monofunctional compounds and bifunctional compounds of the same or greater chain length from monohalides. For example, an alkenyl halide with at least 4 carbons can be converted to a haloalkylborane compound though reaction with diborane, this compound in turn converted to the corresponding haloalkylaluminum complex which then can be protonalyzed, e.g., with water, absolute alcohol, or acetic acid in the absence of air, to form the corresponding chloroalkyl compounds, or which can be oxidized, e.g., with air or an oxygen-containing gas, to the haloalkylaluminum alcoholate. This alcoholate can then be hydrolyzed, e.g., by the procedure disclosed in U.S. 2,921,949, to produce the corresponding halo alcohols. Specific examples include the conversion of 4-chlorobutene to 4-chloro-1-butanol, 4-chloropentene-1 to 4-chloro-1-pentanol, oleyl chloride to hydroxyoctadecyl chlorides, 4-bromobutene-1 to 4-bromo-1-butanol, 4-fluorobutene-1 to 4-fluoro-1-butanol, and 4-iodobutene-1 to 4-iodo-1-butanol.

It is also possible to treat the haloalkylaluminum-Lewis base complex with an olefin, e.g., ethylene, by a modification of the procedure of Hoffman in U.S. 3,035,105, to increase the chain lengths of the alkyl portions of the haloalkylaluminum, e.g., to molecular weights of 400 to 1000 or higher, and thereafter hydrolyze the growth product to obtain long-chain haloalkyl compounds, or oxidize and hydrolyze the growth product to produce long-chain halo alcohols.

The long-chain halo alcohols are desirable intermediates for the synthesis of other products. For example, hydrolysis of the halo group should give the corresponding diol, a monomer much needed in polyurethanes. Oxidation of the hydroxyl group and amination of the halo group should afford the corresponding amino acids, valuable as monomers in polyamide manufacture. Other useful products can be derived from the halo alcohols or from the higher organometallic derivatives by reacting them with reagents such as halogens, phosgene, ethylene oxide, dichloroethylene or chloroformate, etc. The ethylene growth reaction products are further useful in the preparation of long-chain haloalkenes by displacement reactions with olefins or with homologs (e.g., 1,4-chlorobutene).

Only certain haloalkylaluminum-etherates are capable of chain growth, such capability being dependent upon the type of ether constituting the etherate portion of the complex. Suitable ethers include the diphenyl ethers, anisole, and B,B'-dichloroethyl ether. It has been found that these ethers cannot readily displace from a haloalkyl-aluminum-ether complex other types of ethers, e.g., dimethyl ether, diethyl ether, etc., which are not conducive to chain growth. Accordingly, where a haloalkylaluminum-ether complex is to be employed for chain growth, it should be initially prepared in accordance with the present invention from an aluminum alkyl in the presence of an ether which does not inhibit the chain growth reactions, e.g., diphenyl ether, anisole, or B,B'-dichloroethyl ether.

It is preferred to carry out the growth reaction in the temperature range of about 70° and 120° C. in order to minimize dissociation of the haloalkylaluminum-etherate and formation of uncomplexed haloalkylaluminum compounds which in turn could decompose to undesirable side products. This range is somewhat lower than that preferred by Hoffman. It is possible, however, to carry out the reaction in a somewhat broader temperature range; generally, between about 60° and 150° C. Reaction pressures in the range of about 400 to 10,000 p.s.i. are employed with about 1000 to 5000 p.s.i. being preferred.

The following examples are presented as illustrations, without limitation, of embodiments of the subject invention. Quantities are expressed in parts by weight unless otherwise indicated.

EXAMPLE I

*Part A.*—A sample of tri($\omega$-chlorobutyl)borane, 1.35 parts, was added to a solution of 3.75 parts aluminum trimethyl in 10 parts of anisole at room temperature. The reaction mixture was stirred for a few minutes and then cooled to −80° C. and evacuated while trapping the volatile materials at −196° C. The latter condensate was shown to be substantially pure boron trimethyl as shown by infrared spectra. The anisole reaction mixture was treated with water vapor in the absence of oxygen. Fractional condensation at −80° C. gave a product which exerted 41 mm. of Hg at 5° C. This compares to 40 mm. of Hg for n-butyl chloride. Infrared spectra of the −80° C. fraction confirmed the formation of n-butyl chloride as a hydrolysis product. The yield of n-$C_4H_9Cl$ was 88.2% based on the initial boron derivative. This behavior toward hydrolysis served also to confirm the formation of the linkage Al—$CH_2$—$CH_2$—$CH_2$—$CH_2$—Cl as it is known that tri(ω-chlorobutyl)borane is stable toward hydrolysis. Thus, the linkage Al—$CH_2$—$CH_2$—$CH_2$—$CH_2$—Cl was stabilized by complexing with a Lewis base, e.g., an ether.

*Part B.*—To ascertain the effect of incompletely complexing an excess of the alkylaluminum with a Lewis base, the following reaction was carried out in which the Lewis base (anisole) was present in insufficient amount to completely complex an excess of unreacted alkylaluminum.

Into a 5 mm. diameter tube provided with a serum cap, the following reagents were added, without mixing, at room temperature, in the order (1) tri(ω-chlorobutyl) borane, (2) anisole, and (3) ether-free triethylaluminum in the molar ratio of 1.0:2.3:18.2 respectively. Upon mixing heat evolution occurred with no sign of gas formation. After 45 minutes the reaction mixture was analyzed by nuclear magnetic resonance (NMR), to determine the change in concentration of primary chloride in the reaction mixture. After 3 days the decrease amounted to 15% of the initial concentration. Mass spectra of the gas phase showed the presence of boron triethyl. Hydrolysis of the reaction mixture followed by silver nitrate treatment gave a white precipitate of silver chloride. These results showed that the exchange reaction between $AlEt_3$ and $$B(CH_2CH_2CH_2CH_2Cl)_3$$

had occurred, but that the organoaluminum derivative containing chlorine in the alkyl chain had undergone side reactions with the excess, uncomplexed triethylaluminum to give hydrocarbons and aluminum chloride bonds.

*Part C.*—In the absence of ethers, treatment of 5.60 parts of tri-(ω-chlorobutyl)borane with 0.23 part of aluminum triethyl at room temperature resulted in a violent exothermic reaction accompanied by evolution of gaseous hydrocarbons and formation of a viscous brown material.

*Part D.*—To further demonstrate the stability of the haloalkylaluminum-etherate adduct the following experiment was carried out:

Trimethylaluminum-anisole, 0.62 part, was injected through a serum cap dropwise into a stirred solution of 1.09 parts of tri-(ω-chlorobutyl)borane in 4.95 parts of anisole contained in a round-bottomed flask connected in series with a water-cooled condenser and an U-tube immersed in liquid nitrogen. The reaction mixture was heated at 100–110° C. for two hours under an atmosphere of nitrogen and then cooled to room temperature. Infrared analysis of the liquid-nitrogen condensate disclosed the presence of boron trimethyl consistent with the exchange reaction

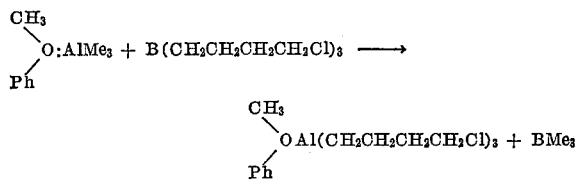

None of the decomposition products observed by Binger and Koster (Tetrahedron Letters No. 4, p. 156 (1961) i.e., butene-1 and methylcyclopropane were present in the condensate.

The reaction mixture was reheated at 80° C. under high vacuum and the volatiles evolved collected in the liquid nitrogen trap. During collection of the final portion of these volatiles, a violent reaction occurred in the reaction flask, forming a viscous brown material. Analysis of the condensate showed in addition to anisole, the presence of methyl chloride, low-boiling hydrocarbons, and a trace of boron trimethyl. The viscous oil, upon treatment with water and silver nitrate solution, gave a silver chloride precipitate, indicating hydrolyzable Al—Cl bonds.

It is evident from this experiment that the haloalkylaluminum compound is stable at temperatures in excess of 100° C. when complexed with an ether, but decomposes at an appreciably lower temperature, e.g., 80° C. when the ether is removed.

EXAMPLE II

A sample, 0.78 part, of tri(ω-chlorobutyl)borane was added dropwise, under inert atmosphere, to a stirred solution of 0.3 part $AlMe_3$ in 6.1 parts of B,B′-dichloroethyl ether. The reaction mixture was placed in a 90 cc. pressure reactor provided with a magnetic stirrer. The reactor was pressurized with ethylene and then rapidly vented. Ethylene was then admitted until a pressure of 1250 p.s.i.g. at room temperature was reached. Upon stirring the pressure decreased to 950 p.s.i.g. within 3 minutes accompanied by heat evolution. The reactor was repressurized to 1250 p.s.i.g. several times until a constant value of 1250 p.s.i.g. was obtained. Heating at 100° C. was then applied overnight. The reactor was then cooled to room temperature where the pressure was 1075 p.s.i.g. The ethylene was then vented through a trap held at −80° C. The −80° C. condensate was shown to contain $BMe_3$ by infrared spectra. The reaction mixture was transferred to a round-bottomed flask. The uncombined B,B′-dichloroethyl ether was removed by vacuum distillation. The remaining residue was treated with anhydrous diethyl ether and finally vacuum distilled at room temperature and $10^{-5}$ mm. of mercury. This treatment was repeated four times to insure complete displacement and removal of the chloroether. A sample of the final residue was hydrolyzed to give a wax soluble in diethyl ether and carbon tetrachloride. Evaporation of the solvent gave a colorless wax with a chloride content of 6.1%, corresponding to an average molecular weight of 585. Infrared absorption spectra showed the presence of long polymethylene chains. NMR studies confirmed the presence of primary chloride and gave an average molecular weight of the wax as 596, in close agreement to that obtained from the chlorine analysis.

Subjecting another sample of the product resulting from the ethylene growth reaction to oxidation by the method of Kirshenbaum and Johnson (U.S. 2,921,949), followed by hydrolysis, also gave a wax. Infrared spectra on the wax disclosed the presence of functional groups (primary alcohol, primary chloride, a long chain of polymethylene and some methyl groups). The molar ratio of hydroxyl and chloride groups in the wax was 1.28 consistent with the presence of polymethylene chlorohydrin and alkyl chlorides. The latter originated from the hydrolysis of unoxidized Al—C bonds.

EXAMPLE III

A sample, 1.64 parts, of a mixture of tri(1-chlorooctadecyl-9)borane and tri(1-chlorooctadecyl-10)borane (prepared from oleyl chloride, sodium borohydride and boron tri-fluoride-etherate in diethyleneglycol dimethylether) was dissolved in 8.9 parts of tetrahydrofuran and free aluminum trimethyl added dropwise. After the addition of 0.53 part of $AlMe_3$, a gaseous product was evolved. The gaseous product was fractionated from tetrahydrofuran by passing through traps maintained at −80° and −196° C. The condensate of the latter contained pure trimethylborane as shown by infrared spectra. Hydrolysis of the reaction mixture and extraction with diethylether, followed by drying with magnesium sulfate and evaporation

What is claimed is:

1. A process for the preparation of a stable haloalkyl-aluminum complex-compound of the formula $$Z:Al(RX)_{3-n}Y_n$$

wherein Z is a Lewis base which does not contain a protonic hydrogen, R is a polymethylene radical of at least 4 carbon atoms in chain length, X is a halogen, and Y is a radical from the group consisting of hydrogen, halogen, and a lower alkyl, and $n$ is an integer ranging from 0 to 2, inclusive, which comprises reacting a haloalkylborane of the formula $$B(RX)_{3-n}Y'_n$$

wherein R, X, and $n$ are as defined above, and Y' is a radical from the group consisting of hydrogen, halogen, and a lower alkyl, with an organoaluminum compound of the formula $$AlR'_{3-n}Y_n$$

wherein R' is from the group consisting of hydrogen and lower alkyl radicals and Y and $n$ are as defined above in the presence of a Lewis base, Z, as defined above.

2. The process of claim 1 wherein the Lewis base is an ether of an element from Group VI-A of the periodic system.

3. The process of claim 1 wherein the haloalkylborane is a trihaloalkylborane.

4. The process of claim 1 wherein the organoaluminum compound is a trialkylaluminum.

5. A process for the preparation of a stable haloalkyl-aluminum complex-compound in which the halogen atoms are positioned on the alkyl chain at least 4 carbons distant from the Al—C bond which comprises reacting substantially equimolar quantities of a haloalkylborane in which the halogen atoms are positioned at least 4 carbons distant from the B—C bond and an aluminum alkyl in the presence of an oxygen ether, at least equimolar in amount to the aluminum alkyl, at a temperature in the range of about 50° to 100° C.

6. The process of claim 5 wherein the haloalkylborane is a trichloroalkylborane.

7. The process of claim 6 wherein the trichloroalkylborane is tri(ω-chlorobutyl)borane.

8. The process of claim 6 wherein the trichloroalkylborane is an isomeric mixture of tri(1-chlorooctadecyl-9) borane and tri(1-chlorooctadecyl-10)borane.

9. The process of claim 5 wherein the aluminum alkyl is from the group consisting of aluminum trimethyl and aluminum triethyl.

10. A haloalkylaluminum-Lewis base complex-compound of the formula $$Z:Al(RX)_{3-n}Y_n$$

wherein Z is a Lewis base which does not contain a protonic hydrogen, R is a polymethylene radical of at least 4 carbon atoms in chain length, X is a halogen and Y is a radical from the group consisting of hydrogen, halogen, and a lower alkyl, and $n$ is an integer ranging from 0 to 2.

11. The complex-compound of claim 10 wherein the Lewis base is an ether of an element from Group VI-A of the periodic system.

12. The complex-compound of claim 11 wherein the Lewis base is an oxygen ether.

13. An oxygen-ether complex of tri(ω-chlorobutyl) aluminum.

14. An oxygen-ether complex of tri(1-chlorooctadecyl-9)aluminum and tri(1-chlorooctadecyl-10)aluminum.

15. A process for the production of stable higher haloalkylaluminum complex-compounds from lower haloalkylaluminum compounds which comprises reacting at a temperature of about 60° to 150° C. and a superatmospheric pressure, a haloalkylaluminum-Lewis base complex with an olefin, said Lewis base being an ether selected from the group consisting of diphenyl ethers, anisole, and B,B'-dichloroethyl ether.

16. The process of claim 8 wherein the olefin is ethylene.

17. A tri(chloroalkyl) aluminum complex of B,B'-dichloroethyl ether in which the average molecular weight of the chloroalkyl groups ranges up to about 700.

References Cited

Binger et al.: Tetrahedron Letters, No. 4, pages 159–160 (1961).

Hoberg: Angewandte Chemie, 73, No. 3 (1961), page 115.

TOBIAS E. LEVOW, Primary Examiner.

H. M. S. SNEED, Assistant Examiner.